(12) United States Patent
Poyhonen et al.

(10) Patent No.: US 9,977,838 B2
(45) Date of Patent: May 22, 2018

(54) CONTENT DISTRIBUTION

(75) Inventors: Ville Petteri Poyhonen, Espoo (FI);
Ove Bjorn Strandberg, Lappböle (FI);
Janne Einari Tuononen, Nummela (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 397 days.

(21) Appl. No.: 14/116,800

(22) PCT Filed: May 12, 2011

(86) PCT No.: PCT/EP2011/057689
§ 371 (c)(1),
(2), (4) Date: Mar. 12, 2014

(87) PCT Pub. No.: WO2012/152334
PCT Pub. Date: Nov. 15, 2012

(65) Prior Publication Data
US 2014/0188922 A1      Jul. 3, 2014

(51) Int. Cl.
*G06F 17/30*     (2006.01)
*G06F 7/00*      (2006.01)
*H04L 29/08*     (2006.01)

(52) U.S. Cl.
CPC ...... *G06F 17/30964* (2013.01); *H04L 67/108* (2013.01); *H04L 67/1063* (2013.01); *H04L 29/08846* (2013.01)

(58) Field of Classification Search
CPC ............. G06F 17/30964; H04L 67/108; H04L 67/1063; H04L 29/08846
(Continued)

(56) References Cited

U.S. PATENT DOCUMENTS 8,676,712 B2 * 3/2014 Darago ................. G06F 21/10
705/57
2004/0148344 A1 7/2004 Navar et al.
(Continued)

FOREIGN PATENT DOCUMENTS

CN       101091184 A      12/2007
CN       101369942 A      2/2009
(Continued)

OTHER PUBLICATIONS

Fang Zhiyuan et al: "Real-Time State Management in Mobile Peer-to-Peer File-Sharing Services"; Service-Oriented Computing and Applications, 2007. SOCA '07. IEEE International Conference on, IEEE PI, Jun. 1, 2007 (Jun. 1, 2007), pp. 255-260, XP031116791, ISBN: 978-0-7695-2861-8, abstract; p. 1, right-hand column, paragraph 2; p. 2, left-hand column, paragraph 2—right-hand column, paragraph 1.

(Continued)

*Primary Examiner* — Kuen S Lu
(74) *Attorney, Agent, or Firm* — Squire Patton Boggs (US) LLP

(57) ABSTRACT

The invention introduces a method to inform/configure a peer-to-peer application environment such that an application can find good alternatives for peer selection and data exchange taking the network configuration conditions including caching strategies and deployment into account. In use, a mobile operator stores a tracker file that is used to provide information of likely locations of a data file sought by an end user. The mobile operator provides instructions to a mobile communication device of the end user regarding the location of a tracker file that is available for use by said mobile communication device. In this way, the mobile operator controls the peer-to-peer environment available to the end user.

16 Claims, 4 Drawing Sheets

(58) Field of Classification Search
USPC .......................................................... 707/758
See application file for complete search history.

(56) References Cited

U.S. PATENT DOCUMENTS

| | | | |
|---|---|---|---|
| 2008/0059631 A1* | 3/2008 | Bergstrom | H04N 7/17318 709/224 |
| 2008/0133666 A1* | 6/2008 | Chavez | H04L 67/104 709/205 |
| 2011/0010421 A1* | 1/2011 | Chavez | H04L 12/6418 709/204 |
| 2011/0055394 A1 | 3/2011 | Bi et al. | |
| 2012/0079029 A1* | 3/2012 | Damola | H04L 12/66 709/204 |

FOREIGN PATENT DOCUMENTS

| | | |
|---|---|---|
| EP | 1 909 465 A1 | 4/2008 |
| EP | 2 320 624 A1 | 5/2011 |
| JP | 2003-520000 A | 6/2003 |
| WO | WO 01/50792 A1 | 7/2001 |
| WO | WO 2009/125760 A1 | 10/2009 |
| WO | WO 2010/023496 A1 | 3/2010 |
| WO | WO 2010/064965 A1 | 6/2010 |

OTHER PUBLICATIONS

Peter Ekler et al: "Experiences of Implementing BitTorrent on Java ME Platform"; Consumer Communications and Networking Conference, 2008. CCNC 2008. 5th IEEE, IEEE CCP, Piscataway, NJ, USA; Jan. 1, 2008 (Jan. 1, 2008), pp. 1154-1158, XP031212068, ISBN: 978-1-4244-1456-7; abstract; p. 1154, left-hand column, paragraph 1—right-hand column, paragraph 1; p. 1155, left-hand column, paragraph 2—right-hand column, last paragraph.

Ekler P et al: "BitTorrent Based Solution for Efficient Content Sharing on Next Generation Networks"; Next Generation Internet Networks, 2008. NGI 2008, IEEE, Piscataway, NJ, USA, Apr. 28, 2008 (Apr. 28, 2008), pp. 300-307, XP031248161, ISBN: 978-1-4244-1784-1; abstract; p. 302, left-hand column, paragraph 2—p. 302, left-hand column, paragraph 3; figure 3.

Bram Cohen: "BEP 3: The BitTorrent Protocol Specification" Internet Citation, Feb. 28, 2008 (Feb. 28, 2008), pp. 1-9, XP002537916, Retrieved from the Internet: URL:http://www.bittorrent.org/beps/bep_0003.html [retrieved on Jul. 16, 2009] the whole document.

Droms Bucknell University R: "Dynamic Host Configuration Protocol; rfc1531.txt"; 5. JCT-VC Meeting; 96. MPEG Meeting; Mar. 16, 2011-Mar. 23, 2011; Geneva (Joint Collaborative Team on Video Coding of ISO/IEC JTC1/SC29/WG11and ITU-T SG.16); URL:http://wftp3.itu.int/av-arch/jctvc-site/, Internet Engineering Task Force, IETF, CH, Oct. 1, 1993 (Oct. 1, 1993), XP015007318, the whole document.

Kiesel University of Stuttgart M Stiemerling NEC Europe LTD N Schwan M Scharf Alcatel-Lucent Bell Labs H Song Huawei S: "ALTO Server Discovery; draft-ietf-alto-server-discovery-00.txt"; Alto Server Discovery; Draft-IETF-Alto-Server-Discovery-00.txt; Internet Engineering Task Force, IETF, Standardworkingdraft, Internet Society (ISOC) 4, Rue des Falaises CH-1205 Geneva, Switzerland, May 5, 2011 (May 5, 2011), pp. 1-25, XP015075618, [retrieved on May 5, 2011] the whole document.

International Search Report application No. PCT/EP2011/057689 dated Nov. 24, 2011.

Hajime Masaoka; "Evaluation of P2P Type File Distribution System Using IP Mobility"; Proceedings of Multimedia, Distribution, Cooperation and Mobile (DICOMO2009) Symposium, IPSJ Symposium Series, vol. 2009 No. 1, Japan, Information Processing Society of Japan, Jul. 8, 2009; pp. 1027-1029.

Gunnar Kreitz, et al.; "Spotify—Large Scale, Low Latency, P2P Music-on-Demand Streaming"; 2010 IEEE; pp. 10.

Japanese Office Action, Notice of Reasons for Rejection application No. 2014-509615 dated Nov. 4, 2014.

Notification of Reasons for Rejection dated Aug. 10, 2015 corresponding to Japanese Patent Application No. 2014-509615.

English translation of Decision of Final Rejection dated Jan. 12, 2016 corresponding to Japanese Patent Application No. 2014-509615.

Kazuhiro Fukuda, "BitTorrent Client," Nikkei Linux, Nikkei Business Publications Inc., Jan. 8, 2007, vol. 9, No. 1, pp. 110-114 with English translation of Figure 1.

First Office Action dated Dec. 1, 2015 corresponding to Chinese Patent Application No. 201180070811.3 and English translation thereof.

* cited by examiner

CONTENT DISTRIBUTION

This invention is related to content distribution. In particular, the invention is related to content distribution in networks that operate in accordance with peer-to-peer (P2P) principles.

Content distribution and caching are key enablers of scalable and well performing network architectures even in today's Internet. Distribution and caching is done on many levels: DNS, Proxy-cache, Content Distribution Network (CDN), data centres just to name few applications used in the current Internet.

Traditionally, Internet content distribution has been implemented using a client-server arrangement. FIG. 1 shows a system, indicated generally by the reference numeral 1, comprising a server 2, a first client 4, a second client 6 and a third client 8. Each of the clients is in two-way communication with the server 2. If, for example, the first client 4 wants access to data stored at the server 2, then the first client sends a request for that data to the server and the server responds by providing the data.

In a client-server arrangement, almost all of the data flow is from the server (such as the server 2) to the client (such as the first client 4). Moreover, in order to obtain data, a download session is initiated by an individual client to an individual server and that session is used to obtain the required data.

It is important to note that in the client-server approach of FIG. 1, a particular client cannot benefit from the earlier actions of a different client. Assume, for example, that the first client 4 downloads a first video file from the server 2. If the second client 6 later wants to view the first video file, that file has to be separately downloaded from the server 2 to the second client 6. The second client 6 cannot take advantage of the fact that the file in question has already been downloaded by a different client (the first client 4).

The traditional client-server approach described above with reference to FIG. 1 is not the only mechanism that can be used to obtain content. Peer-to-peer (P2P) networks, in which clients provide each other with content instead of relying on servers, are becoming common.

FIG. 2 shows a system, indicated generally by the reference numeral 10, comprising a first user 12, a second user 14, a third user 16, a fourth user 18 and a fifth user 20. As in most peer-to-peer networks, many connections exist between different users within the network 10; moreover, those connections may change dynamically. In the exemplary network 10, the first user 12 is in two-way communication with the second, third and fifth users, the second user 14 is in two-way communication with the first, third and fifth users, the third user 16 is in two-way communication with the first, second and fourth users, the fourth user 18 is in two-way communication with the third and fifth users and the fifth user 20 is in two-way communication with the first, second and fourth users.

Consider the situation where the first user 12 wants to download a music track from the network 10. The track is typically divided into a number of elements, often referred to as "chunks". In order for the first user 12 to retrieve the entire music track, all of the chunks of that track must be downloaded.

Assume that the track is available from each of the second 14, third 16 and fifth 20 users in the network 10, but is not available from the fourth user 18. The first user 12 can download chunks of the relevant music file from one or more of the second, third and fifth users in parallel.

The system 10 as described above shows a peer-to-peer arrangement in which data is provided by other peers/clients in the network 10. This is one example of a P2P approach. In a second approach, data is provided by other peers in the network and can also be provided by servers in the network. In a third approach, data is provided only by servers in the network. The third approach differs from the client-server approach described above with respect to FIG. 1 in that data can be obtained from multiple servers.

In a peer-to-peer network, users typically act as both a client (i.e. a consumer of resources) and a source (or cache) of resources. A user may, for example, make a set of downloaded chunks available for other users. Typically, that users will not change the chunks sizes, but some so-called "rechunking" is possible.

Accordingly, once the first user 12 in the example described above with reference to FIG. 2 has obtained the music file, the first user typically makes that file (or at least some of that file) available for other users in the peer-to-peer network to obtain (thereby becoming a source or cache). By way of example, just the first few seconds of the music file may be made available (this is useful since often a second user may only want to hear the first few seconds of a file, rather than the full music file).

In peer-to-peer systems, a particular file is typically split into chunks that are stored in one or more cache locations. A peer-to-peer network often includes files (often referred to as "tracker" files), which files indicate where particular files (or portions of files) can be found in a network. Such tracker files may be implemented by one or more physical nodes in a network, such as the network 10.

FIG. 3 is a flow chart showing a known algorithm, indicated generally by the reference numeral 25, for implementing a peer-to-peer download operation.

Assume that the algorithm 25 is being used by the first user 12 to download a video file that is available at various locations within the network 10. The algorithm 25 starts at step 26, where the first user 12 obtains a tracker file indicating where various portions (or chunks) of the video file can be obtained. The tracker file typically provides a simple list of all users who have previously downloaded the file concerned (and are therefore potentially able to act as caches/sources of the file).

Once the client (i.e. the first user 12) has obtained the tracker file containing a list of potential caches/sources of the requested video file, the algorithm moves to step 27, where the client carries out a selection step to determine which of the potential sources of data listed in the tracker file should be used to attempt to download files. As is well known to persons skilled in the art, this step can be implemented in many different ways, and may be implemented randomly.

In the exemplary algorithm 25, the host selection step 27 selects three sources of data chunks. Those data sources are contacted (steps 28, 30 and 32 of the algorithm 25, which steps are performed in parallel). Thus, the algorithm 25 seeks to download three different chunks of a data file in parallel from three different sources. Clearly, more (or indeed fewer) than three sources could be contacted in parallel. A set of chunks may be downloaded in parallel, or sequentially or in some combination thereof (e.g. a set of parallel sessions each of which download chunks sequentially).

At step 28 of the algorithm 25, a file for downloading has been selected. The algorithm then moves to step 29, where that file is downloaded. Once step 29 has been completed, the algorithm moves to step 34. In parallel, at step 30, a second file for downloading has been selected. The algorithm moves from step 30 to step 31, where the second file is downloaded, before the algorithm moves to step 34. Furthermore, also in parallel, at step 32 a third file for downloading has been selected. The algorithm moves from step 32 to step 33 where the third file is downloaded, before the algorithm moves to step 34. Thus, at steps 29, 31 and 33, the first user 12 downloads chunks of the video file from neighbouring peers in parallel.

Once the steps 29, 31 and 33 have been completed, the algorithm moves to step 34, where the first user determines whether the entire video file has been downloaded. If not, the algorithm 25 returns to step 27, where the downloading process continues. Once the entire video file has been downloaded, the algorithm 25 terminates at step 35.

If the algorithm 25 returns to step 27 (because it is determined at step 34 that the entire video file has not yet been downloaded), a new host selection procedure is initiated to seek further data files from the peer-to-peer network. Once again, the tracker file (obtained in step 26) is used to select potential data sources (or caches) to contact. Once selected, the algorithm 25 moves to steps 28, 30 and 32 and the downloading procedure described above is repeated. Note, however, that the sources contacted are likely to be different to before. This distributes the file providing responsibility (and overhead) to many different nodes in the network.

Peer-to-peer systems have a number of advantages over client-server systems. For example, users within a peer-to-peer network share resources (including, but not limited to, storage space). As a result, as the number of users in a network increases, the capacity of the system increases. This contrasts with client-server systems in which as more users join a system, the resources available to each user decrease.

Another advantage of peer-to-peer networks is that files and other resources are generally available from multiple sources. This results in a more robust system than a traditional client-server system, since the failure of one node in a network does not prevent others users from being able to access files.

Peer-to-peer networks work well when each client is always connected to the network (typically the Internet) and when the cost for data transmission is flat (i.e. unrelated to the quantity of data transmitted).

Mobile communication devices, such as so-called Smartphones, are often always connected to the Internet and can be obtained with a tariff that does not limit data transmission (such that, to the end user, the cost of data transmission is flat). Accordingly, mobile communication devices can be used as part of a peer-to-peer network, such as the network 10. However, there are problems with the application of peer-to-peer principles to mobile communication devices, not least because the current trend is for operators to limit the total data transfer budget that a user can access on a particular tariff in a particular time period (e.g. a maximum data transfer budget for any given calendar month).

Assume that in the system 10, the devices 12, 14, 16 and 18 are all home computers that are connected to the Internet by a home broadband connection.

Assume also that the device 20 is a mobile communication device that is connected to the Internet using a mobile broadband connection.

In the exemplary implementation of the algorithm 25 described above, it was assumed that the first user 12 wanted to download a video file that is available at various locations within the network 10. Assume that the video file can be obtained from any of the second user 14, the third user 16 and the fifth user 20.

Assuming that the devices 14, 16 and 20 are all active, then the first user 12 will seek to download chunks of the video file from all of those users (implementing steps 29, 31 and 33 of the algorithm 25). Downloading files (or chunks) from the fifth user 20 requires the fifth user to upload files from his user device via a mobile network. This uses substantial radio resources, which is expensive (for the end user, the mobile operator or both) and can cause data bottlenecks (thereby reducing performance). The performance reduction of the mobile network may have an impact on the performance of the peer-to-peer network. Moreover, the mobile network may be affected to the extent that the mobile performance for the user for other purposes may be affected. Perhaps more seriously (from the viewpoint of the mobile operator), the performance of the mobile network for other users of the mobile network may be adversely affected.

With the deployment and character of Internet use applying to the mobile network, the upload capability of mobile networks is challenged. As radio/wireless accesses represent an additional challenge for the use of peer-to-peer applications, it can be hard to find good operating conditions for both mobile network (like capacity, delay etc) and peer-to-peer application performance.

Prohibiting or limiting the usage of peer-to-peer principles in mobile networks is not an attractive option for mobile operators, since end users will seek alternative mobile providers. Therefore it is important that vulnerable mobile networks are provided with optimizations that enable smooth and efficient use of mobile networks both from the end user and network perspective.

The present invention seeks to address at least some of the problems outlined above.

The present invention provides a method comprising: an end user using a mobile communication device to seek a tracker file providing information of likely locations of a data file (or data file portions) sought by a user of the mobile communication device; and obtaining the tracker file from a location instructed by a mobile operator used by the mobile communication device. The method may further comprise seeking said data file from one or more locations indicated by said tracker file. The tracker file may, for example, be stored on a server of said mobile operator.

The present invention also provides a method comprising: storing a tracker file at a server of a mobile operator, wherein the tracker file is used to provide information of likely locations of a data file(s) (or data file portions); and providing instructions to one or more mobile communication devices that use said mobile operator regarding the location of a tracker file (or one or more tracker files) that are available for use by said mobile communication devices.

The mobile operator may include one or more servers that are preconfigured to store tracker files.

The mobile operator may include one or more servers that are dynamically allocatable to store tracker files.

The mobile operator may control whether or not the mobile communication device is allowed to carry out an active peer node discovery procedure (typically in order to determine whether one or more neighbour nodes may be able provide the file sought by said end user).

In some forms of the invention, the likely locations of the data file(s) (or file portions) comprise locations that have previously downloaded the data file. The likely locations of the data file(s) may be indicated by an address, such as a URL.

The instructions to the mobile communication devices regarding the location of the tracker file(s) that is/are available for use by said mobile communication device may comprise a server identifier. Alternatively, or in addition, the instructions to the mobile communication devices regarding the location of tracker file(s) that are available for user by said mobile communication device may comprise an absolute reference to the tracker file (e.g. a URL).

The present invention also provides a mobile operator comprising: a server for storing a tracker file, wherein the tracker file is used to provide information of likely locations of a data file (or data file portions); and a control mechanism for providing instructions to a mobile communication device that uses said mobile operator regarding the location of the tracker file(s) that are available for use by said mobile communication device. The control mechanism may make use of a dynamic host configuration protocol (DHCP).

The mobile operator may comprise one or more servers that are preconfigured to store one or more tracker files.

The mobile operator may comprise one or more servers that can be dynamically allocated to store one or more tracker files.

The mobile operator may be configured to control whether or not the mobile communication device is allowed to carry out an active peer node discovery procedure (e.g. in order to determine whether one or more neighbour nodes may be able provide the file sought by said end user).

The likely locations of the data file(s) may comprise locations that have previously downloaded the said data file(s).

The instructions to the mobile communication devices regarding the location of the tracker file(s) that is/are available for use by said mobile communication device comprise a server identifier.

The instructions to the mobile communication devices regarding the location of tracker file(s) that are available for use by said mobile communication device comprise an absolute reference to the tracker file (e.g. a URL).

The present invention yet further provides a mobile communication device comprising means for obtaining a tracker file from a location instructed by a mobile operator used by the mobile communication device, wherein the tracker file is used to provide information of likely locations of a data file (or data file portions) sought by a user of said mobile communication device.

The mobile communication device may further comprise means for seeking said data file from one or more locations provided by said tracker file.

The tracker file may be stored on a server of said mobile operator.

The mobile operator may include one or more servers that are preconfigured to store one or more tracker files.

The mobile operator may include one or more servers that can be dynamically allocated to store one or more tracker files.

The mobile operator may control whether or not the mobile communication device is allowed to carry out an active peer node discovery procedure (in order to determine whether one or more neighbour nodes may be able provide the file sought by said end user).

The present invention also provides a computer program comprising: code (or some other means) for enabling an end user using a mobile communication device to seek a tracker file providing information of likely locations of a data file (or data file portions) sought by the end user; and code (or some other means) for obtaining the tracker file from a location instructed by a mobile operator used by the mobile communication device. The computer program may be a computer program product comprising a computer-readable medium bearing computer program code embodied therein for use with a computer.

The present invention yet further provides a computer program comprising: code (or some other means) for storing a tracker file at a server of a mobile operator, wherein the tracker file is used to provide information of likely locations of a data file (or data files or data file portions); and code (or some other means) for providing instructions to a mobile communication device that uses said mobile operator regarding the location of one or more tracker files that are available for use by said mobile communication device. The computer program may be a computer program product comprising a computer-readable medium bearing computer program code embodied therein for use with a computer.

The present invention tackles the problem of how to inform users (typically mobile device users) of how to access data stored within a P2P network. In other words, how a mobile operator controls access to P2P resources by mobile users (i.e. users of the mobile operator's network(s)).

Network configuration is adjusted so that mobile devices access P2P services in a manner defined by the mobile operator. Specifically, the relevant mobile operator can control where a mobile device obtains a tracker file used to obtain potential locations of P2P files (or file chunks).

One or more data caches/sources may be provided by the mobile operator (i.e. stored in servers at the mobile network). Data caches can be made available to mobile users (so that the mobile users do not need to access data from end users, such as other end users of the mobile operator). The data caches may (or may not) be made available to end users that are not served by the mobile operator (i.e. P2P principles may or may not be applied).

The invention introduces a method to inform/configure the peer-to-peer application environment such that the application can find good alternatives for peer selection and data exchange taking the network configuration conditions including caching strategies and deployment into account. The invented method gives the network operator possibility to reflect the network status in peer-to-peer application execution without revealing network topology of link status. Both application and network can be configured for close to optimal performance.

Exemplary embodiments of the invention are described below, by way of example only, with reference to the following numbered drawings.

FIG. 4 is a block diagram of a system, indicated generally by the reference numeral 40, in accordance with an aspect of the present invention.

Figure 1:
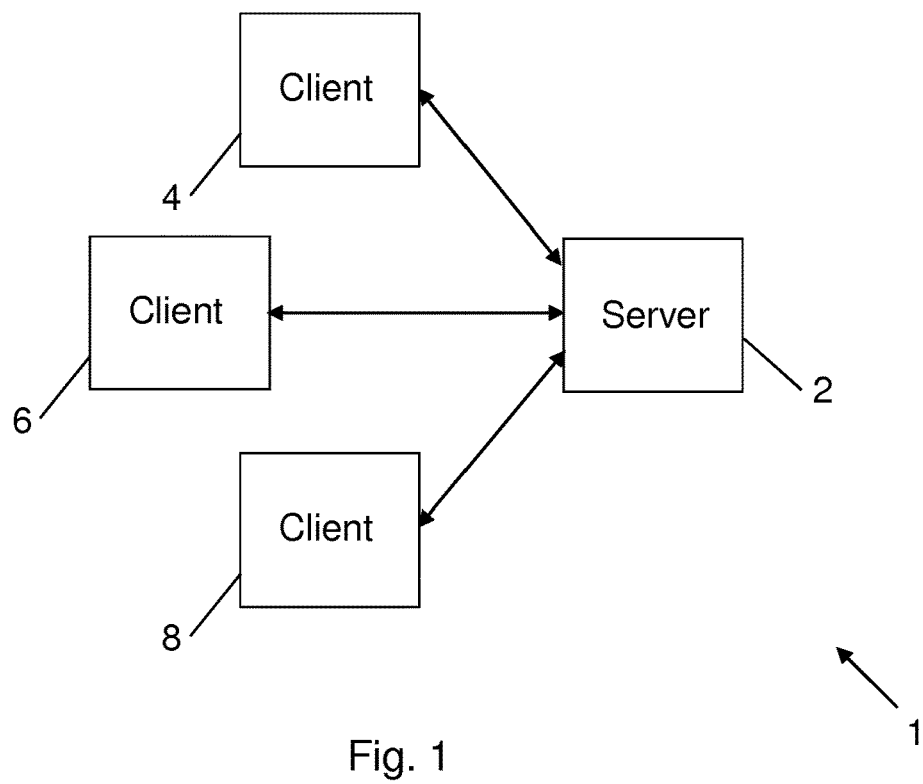
FIG. 1 is a block diagram of a known client-server system.
Figure 2:
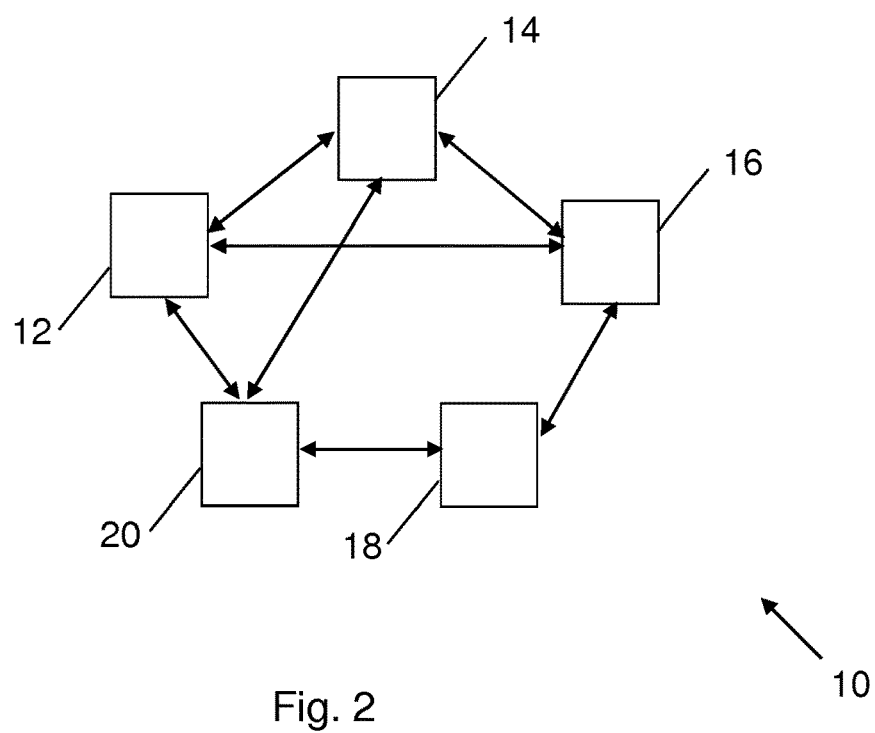
FIG. 2 is a block diagram of a known peer-to-peer network.
Figure 3:
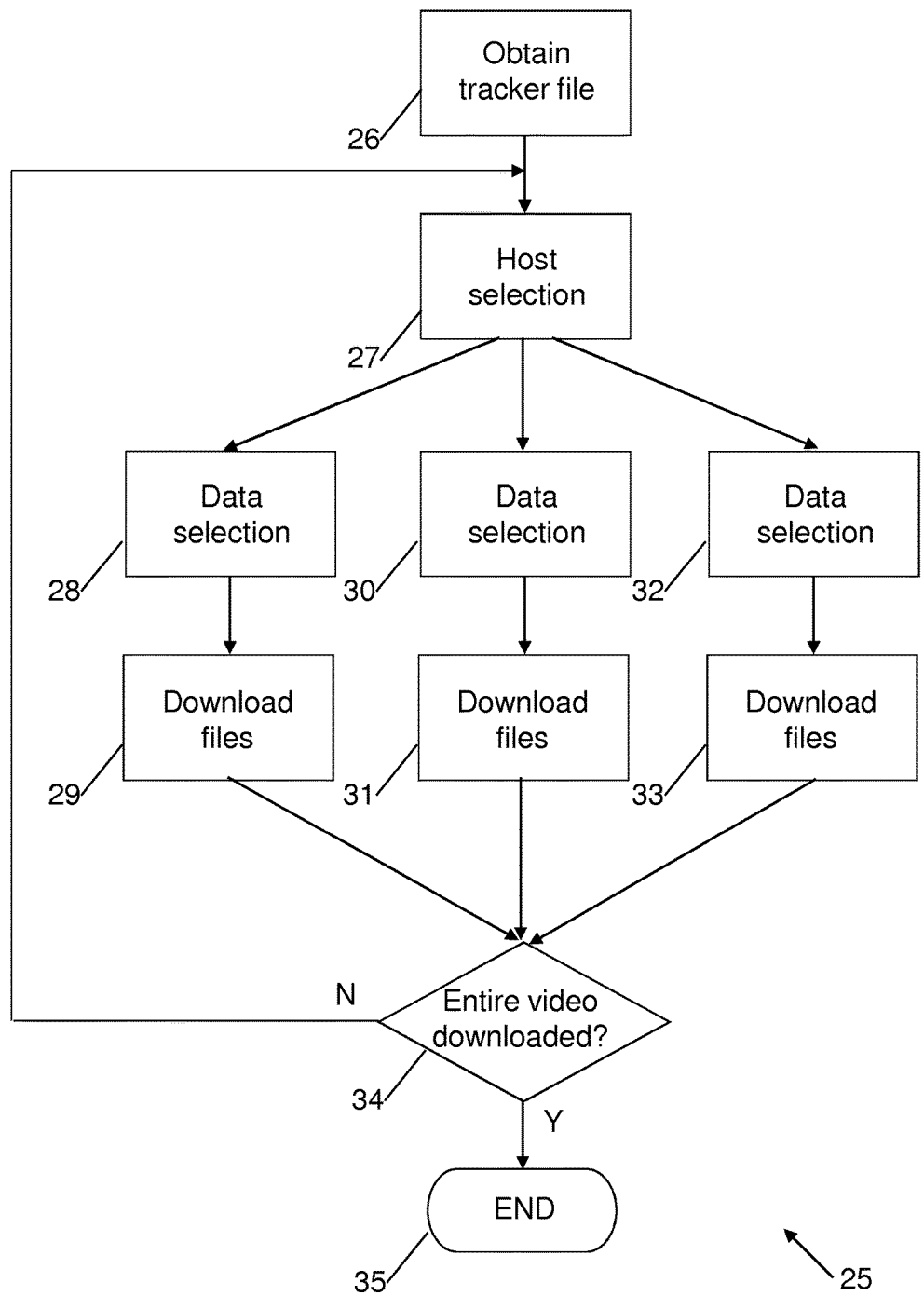
FIG. 3 is a flow chart showing a peer-to-peer download operation.

The system 40 comprises a network 41, such as the Internet. A first user 42, a second user 44 and a third user 46 are each connected to the network 41 and can communicate with one another via the network. The first, second and third users may, for example, connect to the network 41 using a personal computer and a home broadband connection.

Figure 4:
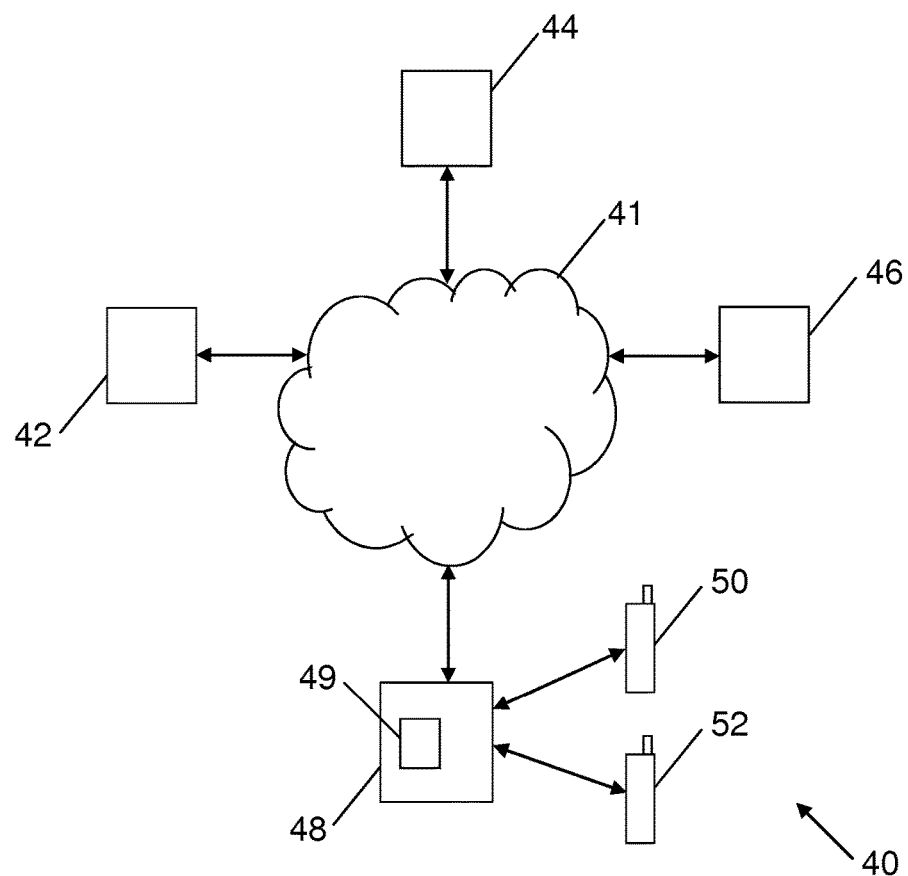
FIG. 4 is a block diagram of a system in accordance with an aspect of the present invention.

The system 40 also comprises a mobile operator 48 that is connected to the network 41. A fourth user 50 and a fifth user 52 (denoted in FIG. 4 using mobile phone symbols) are each connected to the mobile operator 48. The fourth user 50 and the fifth user 52 can each communicate with the first, second and third users via the mobile operator 48 and the network 41.

As described above, if each of the first, second, third, fourth and fifth users are part of a conventional peer-to-peer network, then the uploading of files from the fourth user 50 to other users in the network makes use of the radio connection between the fourth user 50 and the mobile operator 48. Similarly, the uploading of files cached at the fifth user 52 to other users in the peer-to-peer network makes use of the radio connection between the fifth user 52 and the mobile operator 48.

In conventional peer-to-peer networks, each client acts as both an information consumer and a source/cache. These two roles are tightly coupled. As described further below, the system 40 decouples those two roles by providing a cache 49 as part of the mobile operator 48. The cache 49 is used to store files that are available to other users in the peer-to-peer network that would previously have been stored at the end users 50 and 52.

Consider the use of the algorithm 25 once again, this time with the algorithm being used by the first user 42 to download a video file that is available at various locations with the system 40. The algorithm 25 starts at step 26, where the first user 42 obtains a tracker file indicating the location of various portions (or chunks) of the video file can be obtained.

Assume that the relevant video file has been accessed by the second user 44, the third user 46 and the fourth user 50. As traditional peer-to-peer nodes, the second user 44 and the third user 46 each act as a cache/source for the video file and are therefore included in the tracker file provided in the step 26.

The fourth user 50 does not directly act as a cache/source for the video file. Instead, the file is stored within the cache 49 of the mobile operator 48. Accordingly, the tracker file indicates that the video file can be accessed at the first user 44, the second user 46 and the cache 49 of the mobile operator 48.

As before, once the client (i.e. the first user 42) has obtained the tracker file, the first user 42 downloads chunks of the video file from neighbouring peers in parallel. Those peers include the mobile operator 48, but do not include the fourth user 50. Accordingly, the radio connection between the mobile operator 48 and the fourth user 50 is not used.

Thus, whereas in a traditional peer-to-peer scenario, an end users two roles (as both an information consumer and an information source) are tightly coupled, the system 40 decouples those roles, locating them in more optimal places in a mobile network.

However, there remains a problem of informing users how to access data stored within the modified peer-to-peer network. In particular, there remains a problem of controlling access to P2P resources by mobile users, such as the users 50 and 52 described above.

Figure 5:
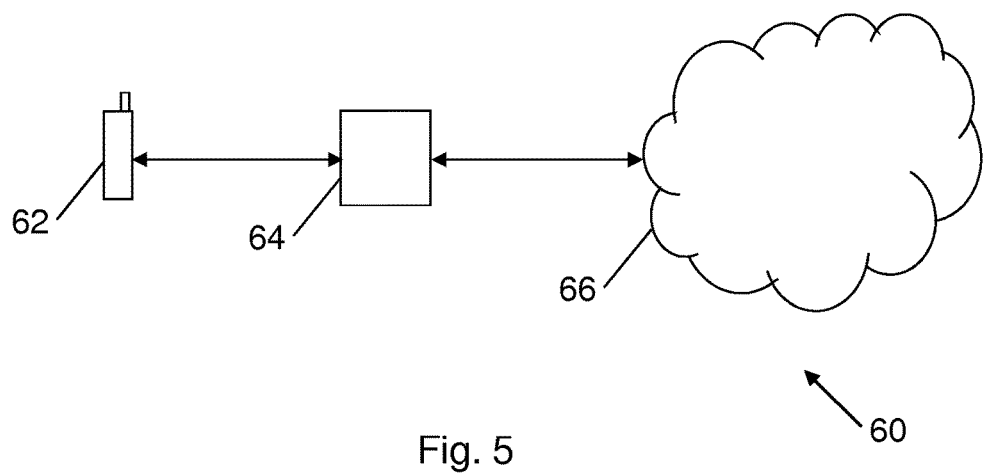
FIG. 5 is a block diagram of a system in accordance with an aspect of the present invention.

FIG. 5 is a block diagram of a system, indicated generally by the reference numeral 60, comprising a mobile communication device 62, a mobile operator 64 and a network 66 (such as the Internet). The mobile communication device 62 is able to access the network 66 via the mobile operator 64. The mobile communication device 62 is configured to access peer-to-peer sources as described below. The mobile device could be used as the fourth user 50 or the fifth user 52 described above with reference to FIG. 4.

Mobile operators (such as the operator 64) know best what their radio access technologies are well suited for peer-to-peer use scenario where their users' devices are acting a cache, i.e., a data source. According to this knowledge, the configuration procedures to take care of the network configuration of mobile devices can be adjusted so that mobile devices access peer-to-peer services in a manner defined by the mobile operator.

In the system 60, the mobile operator 64 defines how the mobile communication device 62 is able to access a tracker list in order to access a particular file using peer-to-peer principles. Thus, the mobile operator 64 controls where a mobile device obtains the tracker file used in step 26 of the algorithm 25 described above.

To do so, the mobile operator 64 provides at least some of the following to the mobile communication device 62:
 1. An active neighbour peer discovery is ON or OFF;
 2. Server ID (e.g. an IP address or fully qualified domain name (FQDN)) where a tracking list can be requested;
 3. Tracking list ID (e.g. http URL) that can be downloaded; and
 4. Preconfigured (generic) tracking list that is supposed to be used for all tracks.

These four options define how a client gets a list of caches for a given file (such as a music or video file). Thus, the present invention enables the mobile network 64 to exercise a degree of control over where the mobile device 62 seeks to obtain peer-to-peer files or file portions. For example, the mobile operator 64 may prevent a mobile device from obtaining files (or file portions/chunks) from a particular source.

Option 1 defines whether or not a client should carry out an active peer node discovery procedure. Option 1 is provided independently of the other three options. If active peer node discovery is not allowed, then the mobile device 62 must rely entirely on tracker lists in order to determine where files can be obtained (which tracker lists are obtained in accordance with one or more of options 2 to 4, as discussed further below). As described further below, in some embodiments of the invention, the tracker files are obtained from the mobile operator 64. Accordingly, the system 60 enables the mobile operator, in some circumstances, to control the extent to which the mobile communication device is able to access peer-to-peer services.

Option 2 defines a server ID from where a client can request the list. This option does not expose the name of a list. This Server ID can, for example, be a peer-to-peer tracker or an operator device.

Option 3 provides an absolute reference to the tracker list. The reference may be expressed, for example, as an http URL (uniform resource locator). Option 3 is therefore very similar to option 2. Option 2 only provides contact information (e.g. IP address) of the server, but does not reveal of how a mobile device should request the list, i.e., what protocol to use. It is perhaps easier for the mobile device 62 to use option 3, since option 3 specifies how to contact the server in question.

Option 4 provides a preconfigured tracker list. For example, the mobile operator 64 may have permanent servers that are always available to provide tracker lists to requesting users (such as the user device 62). In some forms of the invention, the preconfigured tracker list(s) of option 4 may always be available, but may be overridden if other tracker lists (such as lists in accordance with option 2 or option 3) are available. Thus, other options could provide additional caches, with option 4 providing a default list.

By way of example, a preconfigured tracker list may always be available via option 4, but the mobile operator 64 may be sufficiently flexible to be able to dynamically generate new tracker files (e.g. for load balancing or to remove bottlenecks). The new tracker file(s) (which may be temporary) may be generated in accordance with option 2 or option 3 and may override the preconfigured tracker of option 4.

Figure 6:
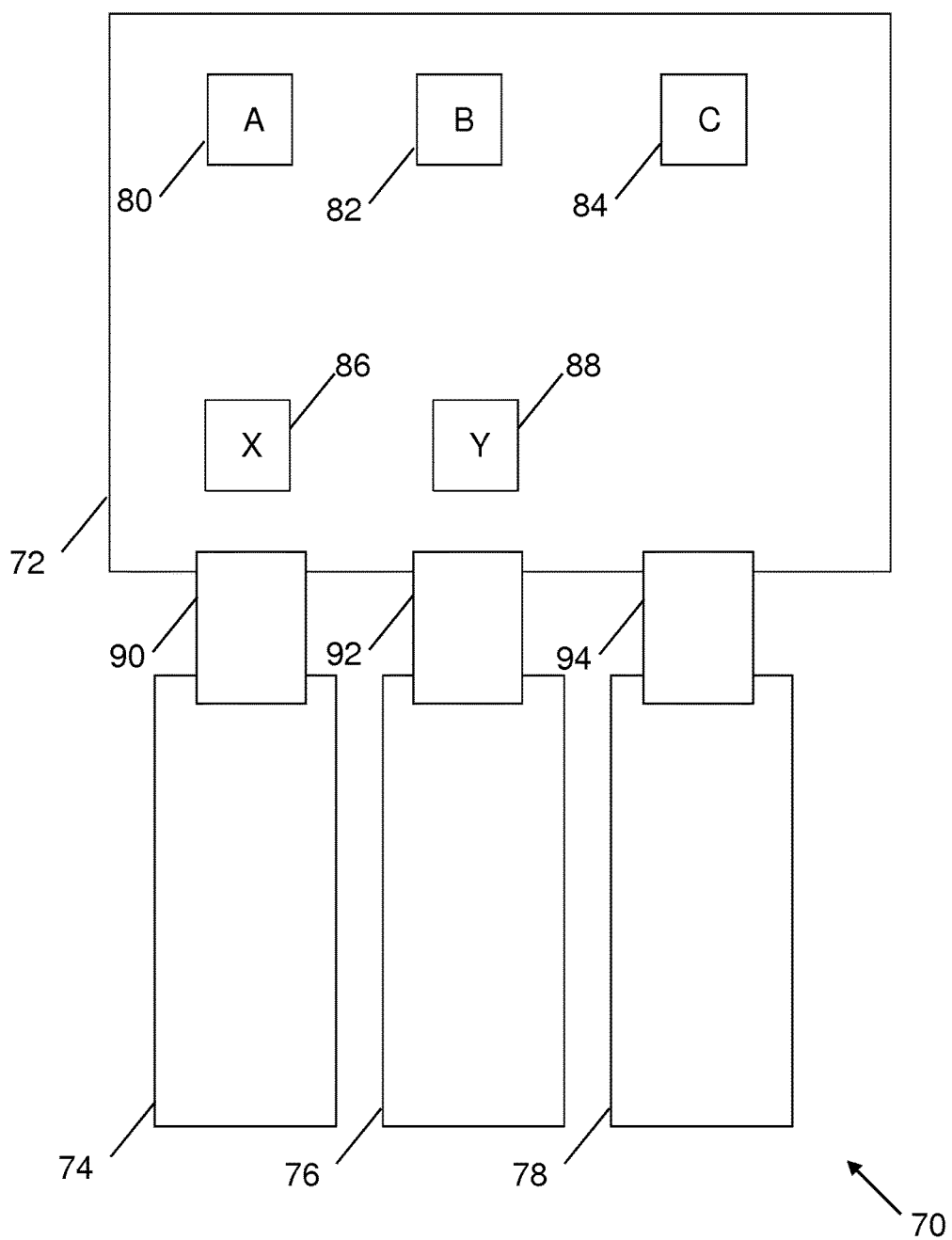
FIG. 6 is a block diagram of a system in accordance with an aspect of the present invention.

FIG. 6 is a block diagram of a system, indicated generally by the reference numeral 70, in which the present invention may be used.

The system 70 comprises a mobile operator 72. The mobile operator 72 provides mobile communications using a number of different technologies. The system 70 includes a first mobile communications network 74, a second mobile communications network 76 and a third mobile communications network 78. A mobile device (such as the mobile device 62 described above) may communicate with the mobile operator 72 using one or more of the networks 74, 76 and 78 (e.g. using access networks including both wireless licensed technology (e.g. 3GPP), non-licensed wireless technology (e.g. WLAN) and wired access networks). By way of example, in one implementation of the system 70, the first network 74 is a 2G network, the second network 76 is a 3G network and the third network 78 is a WiFi network. As will be readily apparent to the skilled person, other communication networks (such as an LTE network) could be used instead of, or in addition to, the networks described above.

The mobile operator 72 includes a number of servers. As shown in FIG. 6, the operator 72 provides a first server 80, a second server 82, a third server 84, a fourth server 86 and a fifth server 88. The servers provide tracker files to mobile devices that are supported by the mobile operator 72.

The system 70 also comprises a mechanism that controls the setup of the communications between the networks and the mobile operator. Thus, a first control mechanism 90 controls the setup of communications between the first network 74 and the mobile operator 72. Similarly a second control mechanism 92 controls the setup of communications between the second network 76 and the mobile operator 72 and a third control mechanism 94 controls the setup of communications between the third network 78 and the mobile operator 72.

In one exemplary embodiment, the control networks 90, 92 and 94 make use of the dynamic host configurable protocol (DHCP). DHCP is a known configuration protocol that is used, for example, for assigning Internet Protocol addresses.

The four options described above for enabling a client (such as a mobile device) to obtain a list of caches for a particular file can be used in the system 70.

As described above, option 1 defines whether or not an active neighbour peer discovery function for a particular mobile device is activated. Typically, DHCP or similar servers serving different RANs (Radio Access Networks) are preconfigured to set option 1 as either on or off. In the exemplary system 70, the DHCP servers 90 and 92 may set option 1 as "OFF" for the first network 74 and the second network 76 respectively. The DHCP server 94 may set option 1 as "ON" for the third network 78.

Thus, when expensive radio resources are being used for communications between a mobile device and the mobile operator 72 (e.g. using a 2G network or a 3G network), then the DHCP servers may indicate that neighbour peer discovery is disabled. However, if, for example, the user device enters a WiFi hotspot (and is using the third network 78), or some other better connection area, then more traditional peer-to-peer systems may become acceptable to the mobile operator 64. In such circumstances, the DHCP server 94 can allow neighbour peer discovery to enable a mobile device to access peer nodes other than those defined by a particular tracker file.

Assume that in the exemplary mobile operator 72, the first server 80 and the second server 82 are always available, the third server 84 is available for use, but no contact details are provided, the fourth server 86 is topologically close to the first network 74 and can be dynamically made available if bandwidth demands require this and the fifth server 88 is topologically close to the second network 76 and can be dynamically made available if bandwidth demands require this.

The first server 80 and the second server 82 are default servers that are always available for use by any mobile device. Accordingly, the first server and the second server are provided as part of option 4. These servers are therefore always available for use in obtaining tracker lists, but their use may be superseded by other options (if available).

The third server 84 is provided as part of option 2. The third server is generally available, but although a server ID is provided, contact details are not given.

The fourth server 86 is not always available, but can be made available for users of the first network 74 if required. The fourth server can be dynamically deployed under the control of the mobile operator 72. Details of the third server are provided to mobile devices using the first network as part of option 3. If the fourth server is available, mobile devices making use of the first network 74 may, in some implementations, use the fourth server in preference to either of the servers made available under option 4.

Similarly, the fifth server 88 is not always available, but can be made available for users of the second network 76 if required. The fifth server can be dynamically deployed under the control of the mobile operator 72. Details of the fifth server are provided to mobile devices using the second network as part of option 3. If the fifth server is available, mobile devices making use of the second network 76 may, in some implementations, use the fifth server in preference to either of the servers made available under option 4.

Thus, using the four options outlined above, an operator (such as the mobile operator 64 of the system 60 or the operator 48 of the system 40) can pre-configure its different radio access networks' configuration procedures to follow the peer-to-peer cache deployment strategy of that mobile operator. The DHCP provides a framework to configure hosts network related parameters but also this framework is extensible meaning that one could add new options. No IETF standardization is needed, however the information provided by the DHCP can be used by the ALTO server (discussed at http://datatracker.ietf.org/wg/alto/) to distribute the client capabilities to give other peer-to-peer clients knowledge of client capabilities for peer selection. The use of DHCP could be one reasonable deployment plan for instance mobile operators with branded handsets where the operators have power to decide how their handsets are suppose to operate and also they might propose new additional functionalities. The invention is useful for other network also especially when considering capabilities of "last mile" access for clients.

The skilled person will be aware that the four options outlined above need not all be provided in any particular system. For example, there may be no default tracker list location (such that option 4 is not provided). There may be only a default tracker list location (such that neither option 2 nor option 3 is provided). One of options 2 and 3 may be provided, but not the other. Further, option 1 may not be provided in all implementations. Accordingly, the present invention includes a very high degree of flexibility.

The invention should also be beneficial for peer-to-peer clients that do not start to utilize the cache in the network as the configuration of the peer-to-peer client with DHCP can influence the P2P peer selection to target clients with better radio and other capabilities. The configured capabilities are available to other peers through direct peer communication or through the utilization of an ALTO type of server.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method comprising:
using a peer-to-peer mobile communication device within a plurality of peer-to-peer mobile communication devices to seek a tracker file providing information of locations of a data file sought by a user of the mobile communication device, wherein the data file is located in at least one other communication device in a peer-to-peer communication network;
obtaining at the peer-to-peer mobile communication device located in a mobile network the tracker file from a location instructed by a mobile operator of the mobile network;
downloading the data file from the at least one other communication device using the tracker file, wherein the at least one other communication device is located outside the mobile network; and
preventing the peer-to-peer mobile communication device located in the mobile network from downloading the data file from a different mobile communication device within the plurality of peer-to-peer mobile communication devices, wherein the different mobile communication device is not indicated in the tracker file as including the data file.

2. A method as claimed in claim 1, wherein said mobile operator includes one or more servers that are preconfigured to store one or more tracker files.

3. A method as claimed in claim 1, wherein said mobile operator controls whether or not the peer-to-peer mobile communication device is allowed to carry out an active peer node discovery procedure.

4. A method as claimed in claim 1, wherein said locations of the data file comprise locations that have previously downloaded the data file.

5. A method as claimed in claim 1, wherein said instructions to the peer-to-peer mobile communication device regarding the location of the tracker file that is available for use by said peer-to-peer mobile communication device comprise a server identifier.

6. A method as claimed in claim 1, wherein said instructions to the peer-to-peer mobile communication device regarding the location of the tracker file that is available for use by said peer-to-peer mobile communication device comprise an absolute reference to the tracker file.

7. A method comprising:
storing a tracker file at a server of a mobile operator of a mobile network, wherein the tracker file is used to provide information of locations of a data file, and wherein the data file is located in at least one other communication device in a peer-to-peer communication network, wherein the at least one other communication device is located outside the mobile network; and
providing instructions to a peer-to-peer mobile communication device located in the mobile network within a plurality of peer-to-peer mobile communication devices that uses said mobile operator to obtain the location of a tracker file that is available for use by said peer-to-peer mobile communication device, wherein the instructions prevent the peer-to-peer mobile communication device located in the mobile network from downloading the data file from a different mobile communication device within the plurality of peer-to-peer mobile communication devices, and wherein the different mobile communication device is not indicated in the tracker file as including the data file.

8. A mobile operator comprising:
a server of a mobile network for storing a tracker file, wherein the tracker file is used to provide information of locations of a data file, wherein the data file is located in at least one other mobile communication device in a peer-to-peer communication network, wherein the at least one other communication device is located outside the mobile network; and
a control mechanism for providing instructions to a peer-to-peer mobile communication device located in the mobile network within a plurality of peer-to-peer mobile communication devices that uses said mobile operator to obtain the location of the tracker file that is available for use by said peer-to-peer mobile communication device, wherein the instructions prevent the peer-to-peer mobile communication device located in the mobile network from downloading the data file from a different mobile communication device within the plurality of peer-to-peer mobile communication devices, and wherein the different mobile communication device is not indicated in the tracker file as including the data file.

9. A mobile operator as claimed in claim 8, wherein said control mechanism makes use of a dynamic host configuration protocol.

10. A mobile operator as claimed in claim 8, comprising one or more servers that are preconfigured to store one or more tracker files.

11. A mobile operator as claimed claim 8, comprising one or more servers that can be dynamically allocated to store one or more tracker files.

12. A mobile operator as claimed in claim 8, wherein said mobile operator is configured to control whether or not the peer-to-peer mobile communication device is allowed to carry out an active peer node discovery procedure.

13. A mobile operator as claimed in claim 8, wherein said locations of the data file comprise locations that have previously downloaded the data file.

14. A peer-to-peer mobile communication device located in a mobile network within a plurality of peer-to-peer mobile communication devices comprising:
means for seeking a tracker file providing information of locations of a data file sought by a user, wherein the data file is located in at least one other communication device in a peer-to-peer communication network, and wherein the at least one other communication device is located outside the mobile network;
means for obtaining the tracker file from a location instructed by a mobile operator of the mobile network;

means for downloading the data file from the at least one other communication device using the tracker file; and means for preventing the peer-to-peer mobile communication device located in the mobile network from downloading the data file from a different mobile communication device within the plurality of peer-to-peer mobile communication devices, wherein the different mobile communication device is not indicated in the tracker file as including the data file.

15. A computer program product embodied in a non-transitory computer-readable medium and encoding instructions that, when executed in hardware, perform a process, the process comprising:

seeking a tracker file providing information of locations of a data file sought by an end user of a peer-to-peer mobile communication device located in a mobile network within a plurality of peer-to-peer mobile communication device, wherein the data file is located in at least one other communication device in a peer-to-peer communication network;

obtaining at the peer-to-peer mobile communication device the tracker file from a location instructed by a mobile operator located in the mobile network;

downloading the data file from the at least one other communication device using the tracker file, wherein the at least one other communication device is located outside the mobile network; and preventing the peer-to-peer mobile communication device located in the mobile network from downloading the data file from a different mobile communication device within the plurality of peer-to-peer mobile communication devices, wherein the different mobile communication device is not indicated in the tracker file as including the data file.

16. A computer program product embodied in a non-transitory computer-readable medium and encoding instructions that, when executed in hardware, perform a process, the process comprising:

storing a tracker file at a server of a mobile operator of a mobile network, wherein the tracker file is used to provide information of locations of a data file, and wherein the data file is located in at least one other communication device in a peer-to-peer communication network, wherein the at least one other communication device is located outside the mobile network; and providing instructions to a peer-to-peer mobile communication device located in the mobile network within a plurality of peer-to-peer mobile communication devices that uses said mobile operator to obtain the location of the tracker file that is available for use by said peer-to-peer mobile communication device, wherein the peer-to-peer mobile communication device downloads the data file using the tracker file, and wherein the instructions prevent the peer-to-peer mobile communication device located in the mobile network from downloading the data file from a different mobile communication device within the plurality of peer-to-peer mobile communication devices, wherein the different mobile communication device is not indicated in the tracker file as including the data file.

* * * * *